Nov. 16, 1926.

J. BENNETT

RATCHET BRACE

Filed March 25, 1924

1,607,584

Inventor
John Bennett

Patented Nov. 16, 1926.

1,607,584

UNITED STATES PATENT OFFICE.

JOHN BENNETT, OF NEWPORT, ENGLAND.

RATCHET BRACE.

Application filed March 25, 1924. Serial No. 701,801.

This invention refers to that type of ratchet braces wherein means are provided to obviate wear and loss of work through friction between the centre point of the feed screw spindle and the upper arm of the supporting device, and wherein the centre point proper is separated from the main feed screw spindle by a ball-bearing, which renders the one rotatable independently of the other.

The present invention consists of an improved construction of rotatable bearing point wherein the end of the feed spindle, whether male or female, or of any known form, is capped to accommodate fixedly a cupped seat for a single ball-bearing. The rotatable point is formed with a shank to fit into the ball cup resting on the ball, and is rotatably retained therein.

In order that the invention may be readily understood, reference is made to the accompanying sheet of drawings, wherein:—

Figure 1:
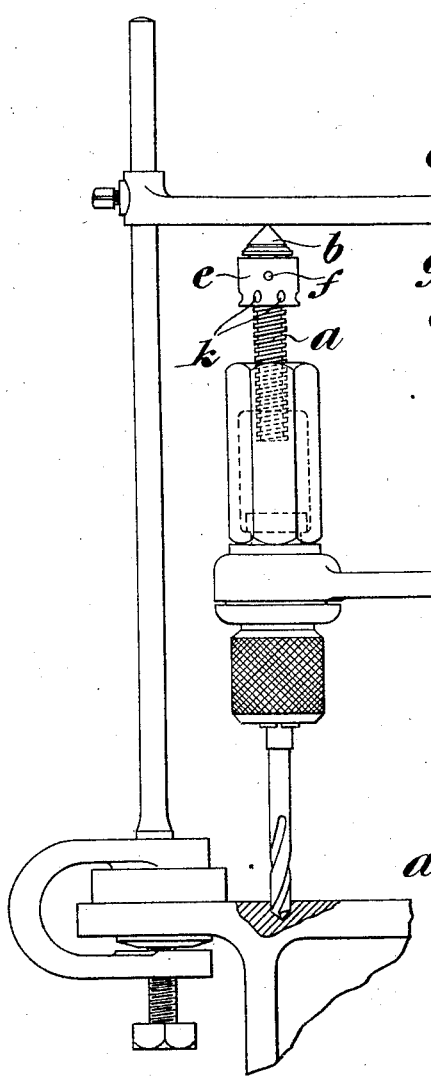
Figure 1 is a view of the general arrangement of a ratchet brace in position of use, wherein the feed screw portion takes the form of an exteriorly threaded cylindrical member.
Figure 3:
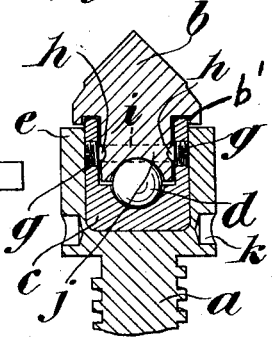
Figure 3 is a sectional elevation thereof at right angles to the plane of Figure 2.
Figure 2:
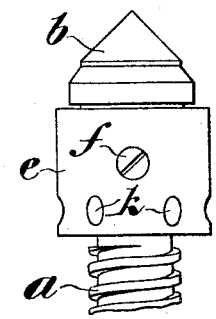
Figure 2 is an enlarged view of the bearing point thereof.
Figure 4:
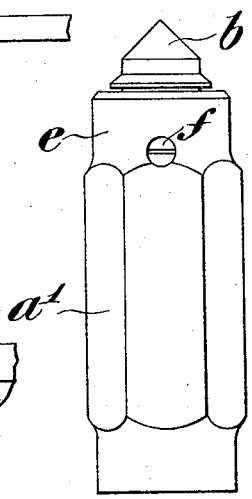
Figure 4 is a view of another type of ratchet brace feed with a bearing point according to the invention.
Figure 5:
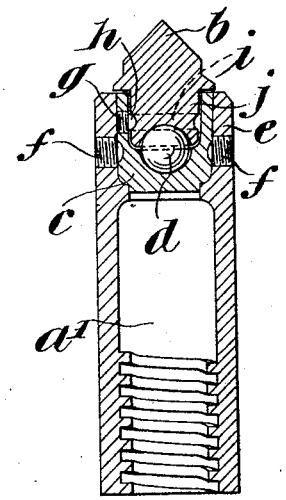
Figure 5 is a sectional elevation thereof at right angles to the plane of Figure 4.

In accordance with this invention, the feed screw portion $a$—Figures 1, 2 and 3— or $a^1$—Figures 4 and 5—of the ratchet brace, is made in two relatively moving parts one being the centre point $b$ separated from the other, the housing cup $c$ of the feed screw, by a centrally disposed ball $d$. This ball $d$ rests between dishes or hollows of a substantially spherical form in the opposed faces of shank and cup respectively. The ball-housing cup $c$ is secured in the socketed or cylindrically recessed end $e$ of the screw $a$ (or $a^1$) by means of a grub screw $f$. The cup $c$ is also provided with grub screws $g$ having protruding ends $h$ engaging an annular runway $i$ in the periphery of the shank $j$ of the pivot point, so that the latter can freely rotate on the ball $d$ and yet be held against longitudinal movement. The center point $b$ is provided at the junction of the body portion thereof with the shank with an annular seat $b'$ which fits over and is designed to travel on the projecting outer end of the cup $c$ which forms a track for this end of the center point and while permitting it to rotate freely relatively thereto prevents lateral wabbling of the point.

In the form of feed screw shown in Figures 1, 2 and 3, a number of tommy holes $k$ are furnished, and flats, hexagonal or otherwise, are formed on the member $a^1$ of the Figures 4—5 construction.

I claim:—

1. A center bearing construction for ratchet braces including the feed screw spindle having a socket, a bearing cup fitted in said socket, a center point having a shank fitting in the bowl of the cup, said shank and cup being provided with complemental recesses forming a ball housing, said shank having an annular groove, said cup having projections extending into said groove to hold the center point against longitudinal movement and yet permit it to rotate, and a ball-bearing fitted in said housing.

2. A center bearing construction for ratchet braces including the feed screw spindle having a socket, a cylindrical bearing cup fitted in said socket with its edge projecting beyond the end face of the socket to form an annular track, a center point having a shank fitting in the bowl of the cup and an annular seat at the base of said shank fitting over the track formed by the projecting end of the cup to permit the point to rotate and be held against lateral wabbling, said shank and cup being provided with complemental recesses forming a ball housing, a ball-bearing fitted in said housing, and cooperating means carried by said cup and shank to hold the shank against longitudinal movement and yet permit it to rotate.

In testimony whereof I have affixed my signature hereto this 5th day of March, 1924.

JOHN BENNETT.